United States Patent [19]
Kuroda

[11] Patent Number: 5,570,167
[45] Date of Patent: Oct. 29, 1996

[54] MOLDED DEVELOPING MAGNET ROLLER

[75] Inventor: Masaaki Kuroda, Tokyo, Japan

[73] Assignee: Canon Kabushiki Kaisha, Tokyo, Japan

[21] Appl. No.: 379,291

[22] Filed: Jan. 27, 1995

Related U.S. Application Data

[62] Division of Ser. No. 962,744, Oct. 19, 1992, Pat. No. 5,453,224.

[30] Foreign Application Priority Data

Oct. 21, 1991 [JP] Japan ................................. 3-272637
Jul. 27, 1992 [JP] Japan ................................. 4-199973

[51] Int. Cl.$^6$ ................................. G03G 15/06
[52] U.S. Cl. ................ 355/251; 118/657; 264/108; 264/DIG. 58
[58] Field of Search ................ 355/251; 118/657, 118/658; 264/24, 108, DIG. 58; 148/103

[56] References Cited

U.S. PATENT DOCUMENTS

| | | | |
|---|---|---|---|
| 4,557,582 | 12/1985 | Kan et al. | 355/251 X |
| 4,604,042 | 8/1986 | Tanigawa et al. | 264/24 X |
| 4,954,800 | 9/1990 | Ohtsuka | 355/284 |
| 5,145,614 | 9/1992 | Kuroda | 264/24 |
| 5,181,971 | 1/1993 | Ohtsuka | 264/24 |
| 5,359,397 | 10/1994 | Yamaji | 355/251 |

*Primary Examiner*—Nestor R. Ramirez
*Attorney, Agent, or Firm*—Fitzpatrick, Cella, Harper & Scinto

[57] ABSTRACT

A hollow, member which serves as a cylinder having an inner configuration which matches the outer configuration of a magnet roller to be manufactured, is mounted in a metallic mold, and then the metallic mold is clamped. A molten resin containing magnetic particles is injected into the mold cavity of hollow member through a runner. Magnetic lines of force are applied to a roller type resin magnet, and such an application is continued. Before the roller type magnetic resin is fully cured, the mold is opened. Then, the magnetic members of a movable mold member 1 are separated from the magnetic members of a stationary mold member so that the distribution of the magnetic flux passing through the hollow member is changed. When the roller type resin magnet is fully cured by cooling, a magnet roller having two pairs of magnetic poles with different surface magnetic flux densities can be obtained.

10 Claims, 14 Drawing Sheets

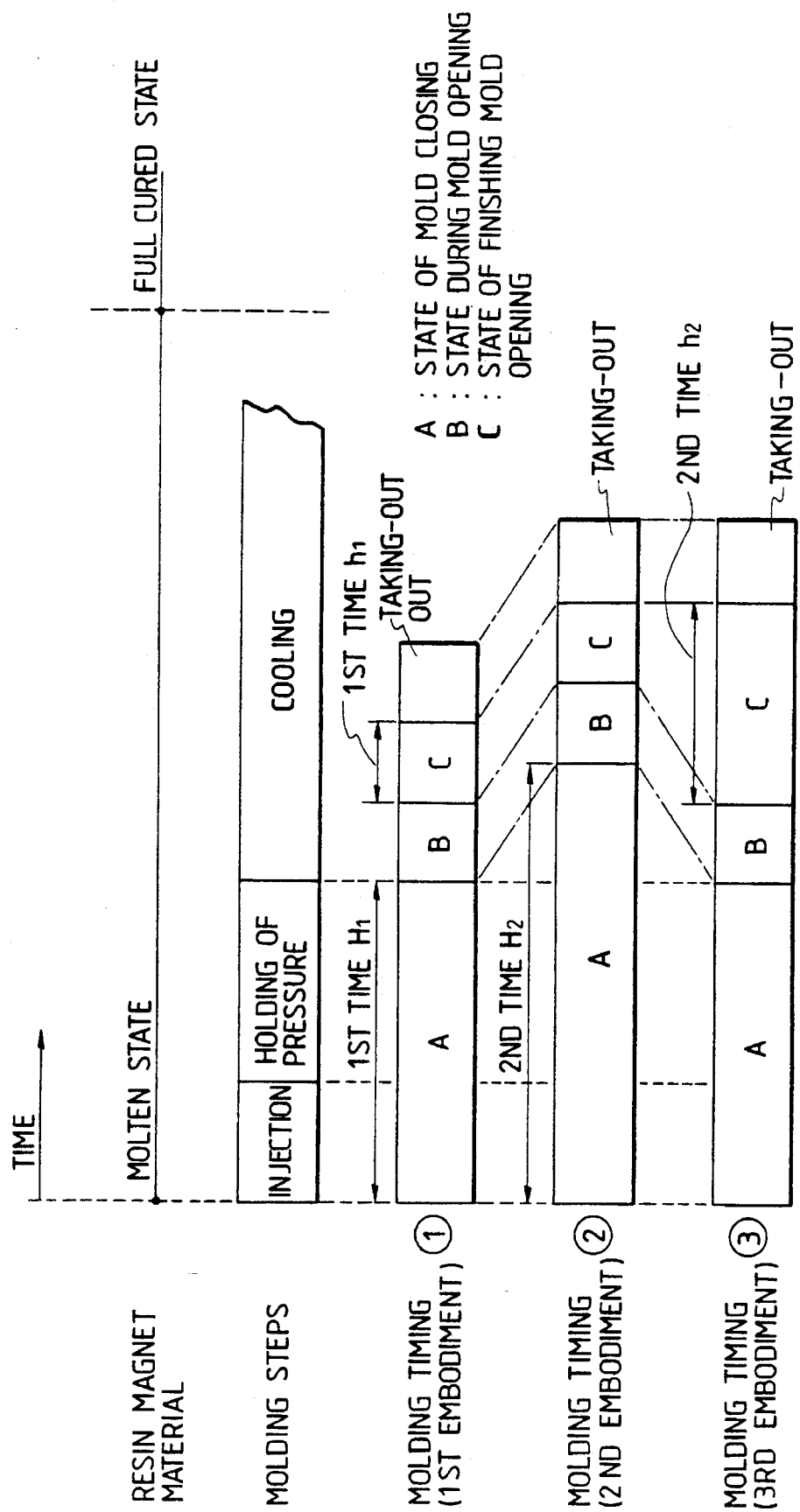

1ST EMBODIMENT

2ND EMBODIMENT

3RD EMBODIMENT

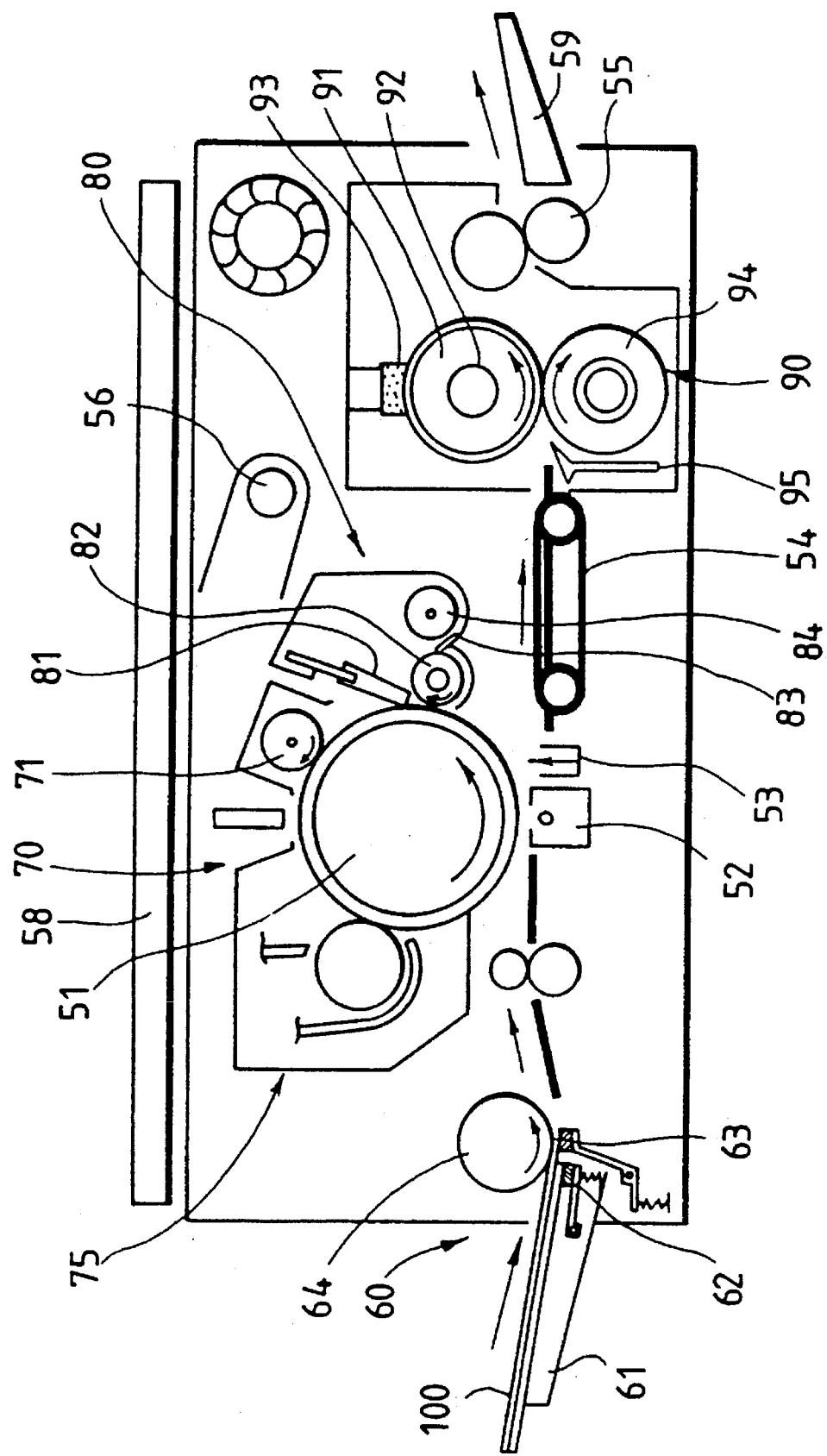

MOLDED DEVELOPING MAGNET ROLLER

This application is a division of application Ser. No. 07/962,744 filed Oct. 19, 1992, now U.S. Pat. No. 5,453,224.

BACKGROUND OF THE INVENTION

1. Field of the Invention

The present invention relates to a magnet roller for use as a magnetic brush development roller e.g., for a copying machine, a laser beam printer, or other printing apparatus. The roller is formed of a resin magnetic material, and is; provided with a plurality of magnetic pole pairs in which the surface magnetic flux density of at least one of the magnetic pole pairs is different from the of the others. The present invention also relates to; a method for manufacturing such a magnet roller and to manufacturing apparatus there for.

Also, the present invention relates to a development unit provided with said magnet roller and a copying apparatus provided with such development unit.

2. Related Background Art

Traditionally, a magnet roller manufacturing method of this kind is one such that a plurality of fan-shaped roller pieces each having magnetic pole pairs are formed in advance so that the magnetic flux density of at least one of the magnetic pole pairs is different from that of the other pairs, and hose roller pieces are connected with each other by adhesive or the like, thereby producing a magnet roller having a plurality of the magnetic pole pairs in which the surface magnetic flux density of at least one of the magnetic pole pairs is different from that of the others.

This magnet roller is mounted in the development ring (sleeve) for use in a conventional development unit having toner arranged around it.

The conventional magnet roller described above has drawbacks in that the dimensional precision and configurational precision of the magnet roller are low since the magnet roller is obtained by connecting a plurality of roller pieces which are prepared individually in advance, and in that the magnetic characteristic eventually deteriorates due to ripples in the magnetic poles.

Also, this magnet roller manufacturing method has a drawback in that productivity is low due to its complicated manufacturing processes.

There is further a drawback in that a development unit (developing machine) provided with such a magnet roller can not control the thickness of the toner or the density of the developed image within a specified range, thus lowering the quality of the developed image. Accordingly, a copying apparatus provided with such a developing machine will inevitably have a drawback in that the quality of its copied image is degraded.

SUMMARY OF THE INVENTION

The present invention has been made in consideration of the above-mentioned drawback. An object of the invention is to provide a magnet roller by integral molding to obtain a high dimensional precision and configurational precision with the result that a desirable magnetic characteristic is obtained.

It is another object of the present invention to provide a method for manufacturing a magnet roller with simple processes and a high productivity as well as a manufacturing apparatus therefor.

It is still another object of the present invention to provide a development unit capable of obtaining good developed images and a copying apparatus capable of producing images of desirable quality.

In order to achieve the above-mentioned objects, a magnet roller according to the present invention is provided in the form of a product integrally molded by resin magnetic material with a plurality of magnetic pole pairs each having a magnet exciting pole and a magnet ending pole forming magnetic lines of force for orientation on the circumferential portion thereof, the surface magnetic flux density of at least one of the magnetic pole pairs differing from that of the other magnetic pole pairs.

Also, there is provided a method for manufacturing a magnet roller according to the present invention, wherein a mold comprising a stationary mold member and a movable mold member is prepared in which a non-magnetic metallic cylinder having an inner configuration conforming with an outer configuration of a magnet roller to be molded, and pairs of magnetic poles comprising a magnetic exciting pole and a magnetic ending pole forming magnetic lines of force, are arranged at circumferential positions of a cavity therefore. The method includes the steps of:

closing the mold to mount the cylinder in the cavity;

injecting molten resin containing magnetic particles into the cylinder to form a roller type resin magnet, and applying magnetic lines of force to the magnetic particles in the roller type resin magnet, from outside the cylinder to inside the roller type resin magnet, in order to form plural pairs of magnetic poles in the roller type resin magnet; and opening the mold before the roller type resin magnet is fully cured while application of said magnetic lines of force is continued, and causing at least one pair of the magnetic poles of the roller type resin magnet to separate from the stationary mold member.

Also, in the above-mentioned magnet roller manufacturing method, at least in the step of opening the mold, the temperature of the mold member in which the cylinder remains, is maintained higher than that of the other mold member alternatively, prior to the mold opening step, the temperature of each mold member is maintained substantially equal and then, after the mold opening process is started, the outer surface of the cylinder which is not held by the mold member is cooled by a coolant. Such treatment is effective for the manufacturing precess.

An apparatus for manufacturing a magnet roller according to the present invention comprises:

a mold provided with a stationary mold member and a movable mold member with the magnetic pole pairs having a magnetic exciting pole and magnetic ending pole forming magnetic lines of force arranged at circumferential positions of a mold cavity;

a cylinder having a hollow member with an inner configuration which matches the outer shape of a magnet roller to be molded, and the end portion thereof which corresponds to at least one of the axial portions of the magnet roller being separable, and a notch by which a hollow portion of the cylinder communicates with a resin path of the mold when the cylinder is mounted in the cavity of the mold being provided; and injecting means for injecting resin magnetic material into the cylinder.

Further, in the above-mentioned magnet roller manufacturing apparatus, there are provided a temperature controller for setting respective temperatures for the stationary mold member and the movable mold member, and a cylinder cooling device for applying a coolant over the outer surface of the cylinder, which is not held by the mold members.

A development unit according to the present invention comprises:

- a rotary sleeve for developing a latent image by holding toner to be carried and supplied to a photo-sensitive drum;
- a magnet roller as mentioned above, which is installed in the sleeve; and
- a blade arranged at a position opposite one of the magnetic poles of the magnet roller, having a gap therebetween for regulating the thickness of the toner.

Also, a copying apparatus according to the present invention comprises:

- a development unit according to the present invention for transferring toner images onto a copying member;
- a feeding unit for supplying copying members to the development unit;
- a cleaning unit for cleaning the surface of a photosensitive member subsequent to having transferred the toner image onto the copying member; and
- a fixing unit for fixing to the copying member the toner image transferred onto it.

A magnet roller according to the present invention is integrally molded of resin magnetic material and has a high dimensional precision as well as a high configurational precision.

In order to manufacture this magnet roller, according to the method of the present invention, there are prepared in advance a non-magnetic metallic cylinder having an inner shape which matches with the outer shape of a magnet roller to be manufactured, and a mold provided with a stationary mold member and a movable mold member, with magnetic pole pairs having a magnetic exciting pole and a magnetic ending pole for the magnetic lines of force arranged at the circumferential positions of the cavity.

Then, the cylinder is incorporated in the mold which has been opened. After the mold is clamped, molten resin containing magnetic particles is injected into the cylinder to produce a roller type resin magnet. At this juncture, a plurality of magnetic pole pairs are formed on the roller type resin magnet, because the magnetic lines of force generated by each of the magnetic pole pairs provided at the stationary and movable members is applied toward the inside of the roller type resin magnet from the outside of the cylinder.

Further, while the application of magnetic lines of force is continued, the mold is opened before the roller type resin magnet is fully cured, and the magnetic pole pair on the movable mold member is separated from the magnetic pole pair on the stationary mold member. At this juncture, the magnetic lines of force between the magnetic pole pair on the stationary member are relatively separated away from the roller type resin magnet. The magnetic flux density of the magnetic lines of force connecting the magnetic pole on the movable mold member with the magnetic pole on the stationary mold member and passing through the roller type resin magnet, become greater on the movable mold member side, and the distribution of the magnetic flux passing through the cylinder is changed. Thus, the magnetic flux density o#the magnetic pole pair on the movable mold member side, which is formed on the roller type resin magnet, is greater than that of the magnetic pair on the stationary mold member side.

Further, according to the present invention, the temperature of the roller type resin magnet becomes higher on the movable mold member side than the stationary mold member side in the step of opening the mold. Accordingly, the roller type resin magnet is molten more on the movable mold member side than the stationary mold member side. Thus, the difference in the degree of magnetic flux density of the magnetic pole pair on the movable mold member side and the magnetic pole pair on the stationary mold member side formed on the roller type resin magnet becomes greater.

Further, according to the present invention, a more desirable development can be conducted as a result of the enhanced magnetic polar characteristics of the magnet roller.

Further, according to the present invention, the quality of images becomes higher.

BRIEF DESCRIPTION OF THE DRAWINGS

FIG. 8 is a view showing the formation timings in a method for manufacturing a magnet roller according to the present invention.

FIG. 9A shows the molded product produced in accordance with formation timing ①; FIG. 9B, with formation timing ②; and FIG. 9C, with formation timing ③, respectively.

FIG. 22 is a view showing the structure of a copying machine as a printing apparatus according to the present invention.

DETAILED DESCRIPTION OF THE PREFERRED EMBODIMENTS

Now, with reference to the accompanying drawings, description will be made of the following embodiments according to the present invention.

Figure 7:
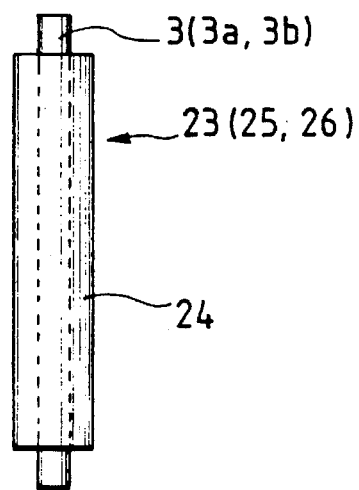
FIG. 7 is a front view showing the molded product shown in FIG. 6.
Figure 9A:
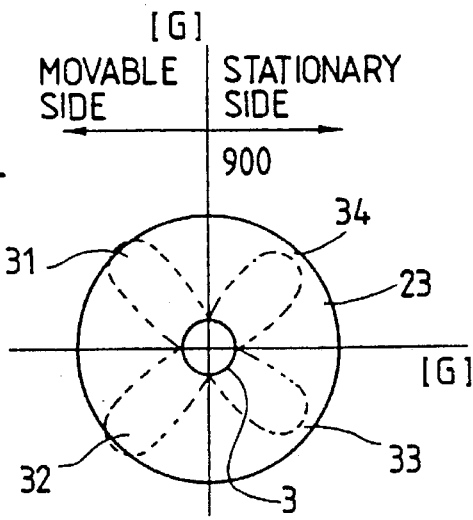
FIGS. 9A to 9C are graphs showing the distribution of the surface magnetic flux density of the magnet roller obtained in accordance with the three formation timings shown in FIG. 8.

As shown in FIG. 7 and FIG. 9A, a magnet roller according to the present invention is a molded product in which a core bar 3 and a roller portion 24 made of resin magnetic material are integrally molded. At the circumferential positions of the molded product shown on the left-hand side in FIG. 9A, there is provided a magnetic pole pair comprising a magnetic pole $N_1$ 31 magnetic exciting pole) and a magnetic pole $S_1$ 32 magnetic ending pole) magnetic flux. Also, at the circumferential positions of the molded product shown on the right-hand side in FIG. 9A, there is provided a magnetic pole pair comprising a magnetic pole $N_2$ 33 and a magnetic pole $S_2$ 34. The magnetic flux density of the magnetic pole $N_1$ 31 and magnetic pole $S_1$ 32 is 980 G (gauss) on one hand, and the magnetic flux density of the magnetic pole $N_2$ 33 and magnetic pole $S_2$ 34 is 820 G on the other.

Figure 9B:
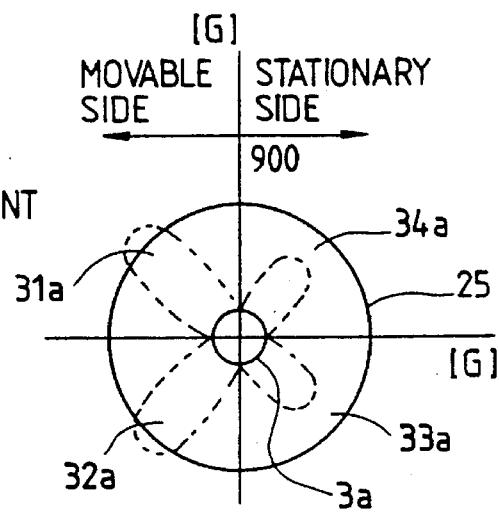
Figure 9C:
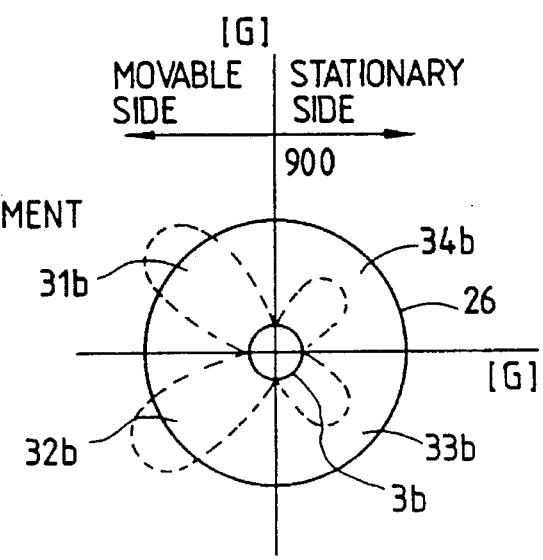

Also, in FIG. 9B, a magnet roller is shown in which the magnetic flux density of the magnetic pole $N_1$ 31a and magnetic pole $S_1$ 32a is set 1,150 G on one hand, and the magnetic flux density of the magnetic pole $N_2$ 33a and magnetic pole $S_2$ 34a is set 670 G on the other. In FIG. 9C, a magnet roller is shown in which the magnetic flux density of the magnetic pole $N_1$ 31b and magnetic pole $S_1$ 32b is 1,350 G on one hand, and the magnetic flux density of the magnetic pole $N_2$ 33b and magnetic pole $S_2$ 34b is 500 G on the other.

The description will be made of embodiments of the method for manufacturing a magnet roller according to the present invention, with reference to the accompanying drawings.

First Embodiment

At first, the description will be made of a manufacturing apparatus comprising a metallic mold, hollow member and others which is used for implementing a first embodiment of the method for manufacturing a magnet roller according to the present invention.

Figure 1:
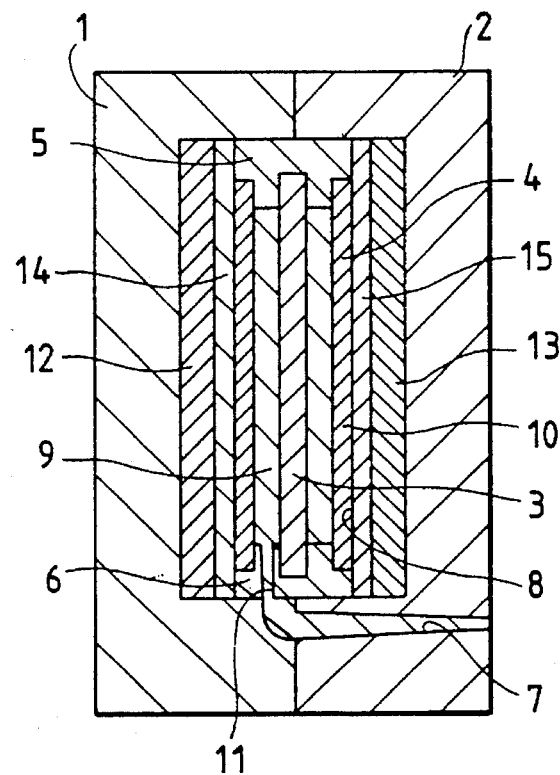
FIG. 1 is a cross-sectional view showing the principal part of the manufacturing apparatus comprising a metallic mold, a hollow member and others used for implementing a first embodiment of a magnet roller manufacturing method according to the present invention, and illustrating a state in which the metallic mold is closed.
Figure 2:
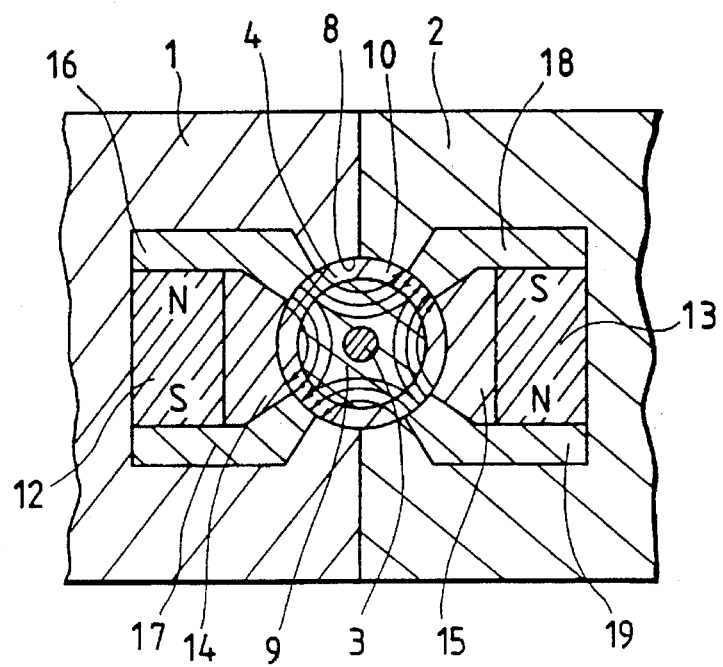
FIG. 2 is a transverse sectional view of the apparatus shown in FIG. 1.

As shown in FIG. 1 and FIG. 2, a movable mold 1 for constituting the metallic mold is mounted on the movable base of an injection molding machine (not shown) while a stationary mold 2 is mounted on the stationary base (not shown). Then, the metallic mold is closed by moving the movable base toward the stationary base side. A column-shaped mold body cavity 8 is formed by the movable mold 1 and the stationary mold 2 of the closed metallic mold. A runner 7 as a resin path communicates with the cavity 8.

Two magnetic members 16 and 17 as a pair of magnetic poles are embedded in the movable mold 1. Further, between the two magnetic members 16 and 17, a non-magnetic member 14 and a permanent magnet 12 are embedded sequentially from the cavity 8 side. These two magnetic members 16 and 17 and the non-magnetic member 14 are positioned at the circumferential positions of the cavity 8. Similarly, on the stationary mold 2, two magnetic members 18 and 19 are also embedded as a pair of magnetic poles. Further, between the two magnetic members 18 and 19, a non-magnetic member 15 and a permanent magnet 13 are embedded sequentially from the cavity 8 side. The polarities of the two permanent magnets 12 and 13 are opposite to each other, and these polarities are opposite to the two magnetic members 16 and 17 and two magnetic members 18 and 19, respectively. Also, the two permanent magnets 12 and 13 are of a rare earth magnet (samarium-cobalt magnet or neodium-iron magnet) and its surface magnetic flux density is approximately 8 KG. With these structures, the two magnetic members 16 and 19 and two magnetic members 17 and 18 become the magnetic exciting pole and magnetic ending pole for the orientational magnetic flux, respectively.

The hollow member 10 serving as the non-magnetic metallic cylinder comprises a column type pipe 4, end portions 5 and 6 which are supportably provided for respective ends of the pipe 4, and a core bar 3 which will be described later. The outer configuration thereof is of a column type which matches the shape of the cavity 8.

Various surface hardening treatments are given to the inner face of the hollow member 10, and its inner configuration is made to match with the outer shape of a magnet roller to be molded. The two end portions 5 and 6 constitute corresponding portions at both ends of the magnet roller, respectively. Also, in the center of the two end portions 5 and 6, a hole is formed into which respective ends are of the core bar 3 are inserted. When the hollow member 10 is mounted in the cavity 8, the central axis of the core bar 3 is matched with the central axis of the cavity 8. In this respect, core bar 3 is not necessarily needed. A hole 11 is formed in the lower end portion 6, and the runner 7 communicates through hole 11 with the hollow portion of the hollow member 10 when the hollow member 10 is mounted in the cavity 8. A resin magnetic material can be injected into the hollow member 10 from an injection molding machine (not shown) through the runner 7 and the hole 11 sequentially.

Description will now be made of a method for manufacturing a magnet roll embodying the present invention.

This manufacturing method is such that a molded product will be made by injection molding on the basis of the formation timing ① shown in FIG. 8.

As shown in FIG. 1 and FIG. 2, the fluctuation of the room atmospheric temperature is maintained within 5° C. and then the metallic mold is firstly closed to mount the preliminarily heated hollow member 10 in the cavity 8. Thus the metallic mold is clamped. The preliminarily molten resin magnetic material composed of ferromagnetic particles and binder is injected into the hollow member 10 from the nozzle of an injection molding machine (not shown) through the runner 7 and hole 11 sequentially. Thus, the inside of the hollow member 10 is filled with the resin magnetic material, to mold a roller type resin magnet 9. At this juncture, the ferromagnetic particles in the roller type resin magnet 9 are orientated by magnetic line of force for orientation concerning each of the magnetic members 16, 17, 18, and 19, thus four pairs of magnetic poles are formed (at A of the formation timing ① in FIG. 8).

As the resin magnetic material, a plastic magnet material containing 90 wt % of strontium is used ferrite in the present embodiment. As major molding conditions, the following can be named: temperature of the movable mold and stationary mold is 110° C., molding temperature is 300° C., and injection pressure is 900 kgf/cm².

Figure 3:
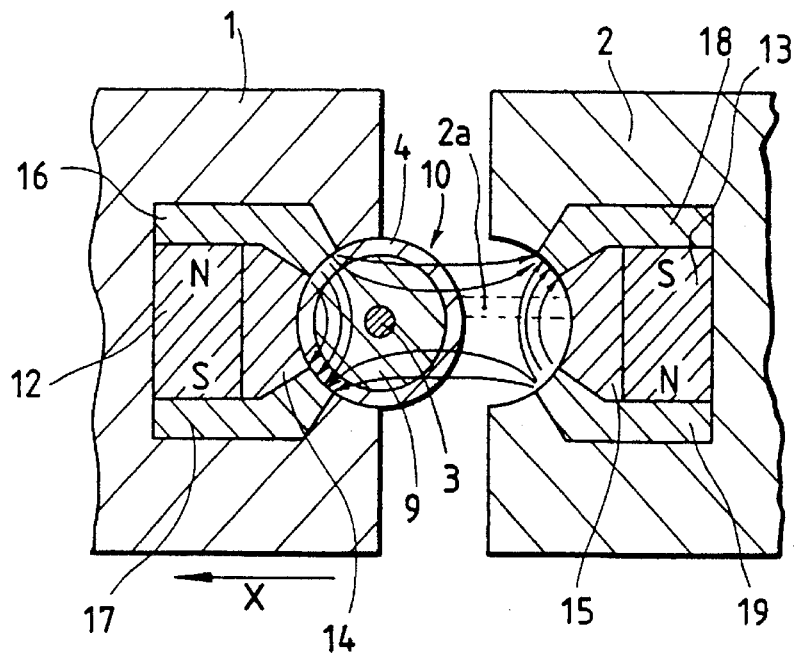
FIG. 3 is a view similar to FIG. 2 illustrating the state of the metallic mold in the course of being opened.
Figure 4:
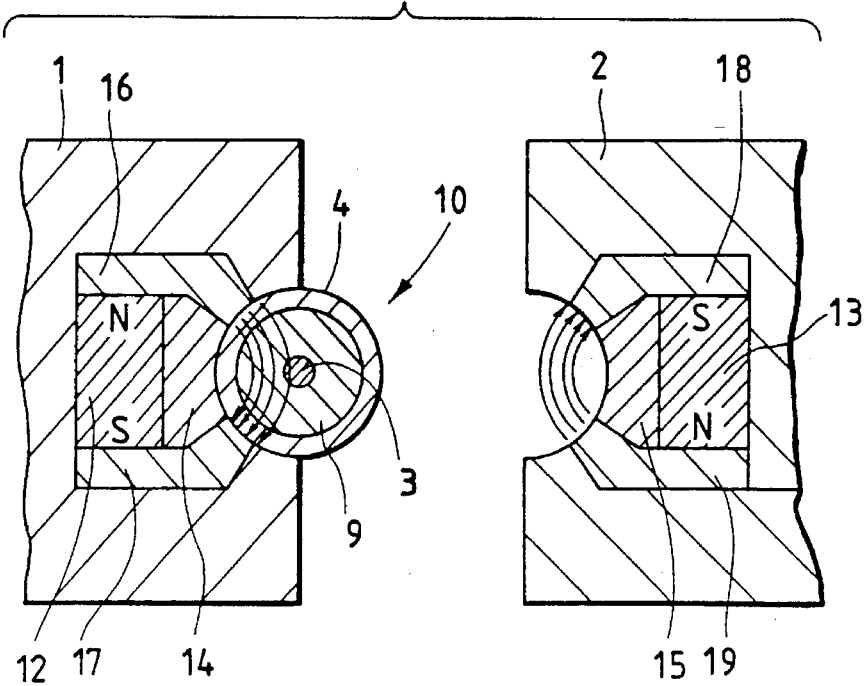
FIG. 4 is a view similar to FIG. 2 illustrating the state of the metallic mold having been completely opened.
Figure 5:
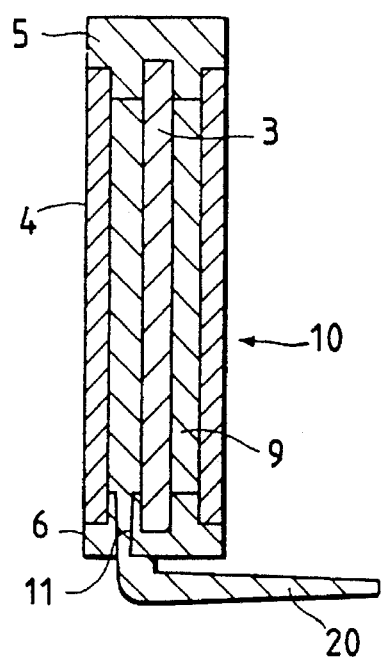
FIG. 5 is a view showing the state of the hollow member shown in FIG. 4, which is removed from the metallic mold.

Subsequent to the injection of the resin magnetic material, a dwelling step is given for approximately 10 seconds. Then, after a first time period $H_1$ (refer to FIG. 8, 12 seconds in the present embodiment) has elapsed, and before the injected material is cooled to be fully cured as to roller type resin magnet 9, that is, immediately after the completion of the dwelling process, the metallic mold is opened to separate the magnetic pole pair of the movable mold 1 from the magnetic pole pair of the stationary mold 2. While the mold is being opened as shown in FIG. 3 (at B of formation timing ① in FIG. 8), the hollow member 10 is conveyed in the direction indicated by an arrow X together with the movable member 1 by a biasing spring force of a pressure member 2a provided at the stationary mold member 2. Thus, the magnetic lines of force between the magnetic members 18 and 19 of the stationary mold member 2 are separated from the roller type resin magnet 9, and the magnetic flux density of the magnetic lines of force connecting the magnetic members 16 and 17 of the movable mold member 1 with the magnetic members 18 and 19 of the stationary mold member 2 and passing through the roller type resin magnet 9, become greater on the movable mold 1 side. Thus, the magnetic flux passing through the inside of the hollow member 10 is changed, whereby the magnetic flux density of the magnetic pole pair on the movable mold 1 side becomes greater than that of the magnetic pole pair on the stationary mold 2 side in the two pairs of the magnetic poles formed in the roller type resin magnet 9. As shown in FIG. 4, after a state that the mold opening is finished (at C of formation timing ① in FIG. 8) is maintained for the first time $h_1$ (two seconds in the present embodiment), the metallic mold is taken out from the hollow member 10 (that is, the state shown in FIG. 5).

Figure 6:
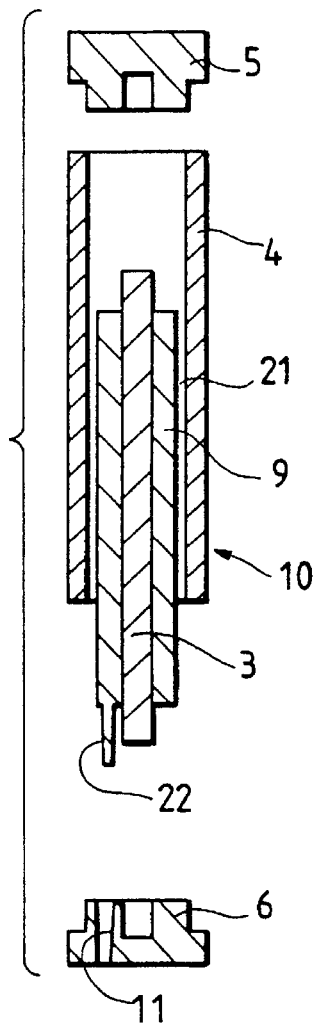
FIG. 6 is a vertical sectional view showing the state where a molded product is being removed by separating the hollow member shown in FIG. 5.

As shown in FIG. 6, when the roller type resin magnet 9 in the hollow member 10 has further cooled, a gap 21 forms between the molded product and the pipe 4 due to the cooling contraction of the roller type resin magnet 9. The runner portion is cut off approximately five minutes after the hollow number is removed from the mold cavity defined by the stationary and movable mold elements. Further the two end portions 5 and 6 of the hollow member 10 are separated from the pipe 4 to remove the molded product from the pipe 4. Lastly, the gate portion 22 of the molded product is cut off, and a ground finish is given to the cut-off portion, to obtain a magnet roller 23 of 200 mm long and 20 mm diameter integrally formed with a roller portion 24 molded with a core bar 3 and resin magnetic material as shown in FIG. 7 and FIG. 9A. The distribution of the surface magnetic flux density of the magnet roller 23 is indicated by broken lines in FIG. 9A.

Second Embodiment

Description will be made of a second embodiment of the method for manufacturing a magnet roller according to the present invention.

First description will be made of a manufacturing apparatus comprising a metallic mold, a hollow member and other elements used for implementing this manufacturing method.

Figure 10:
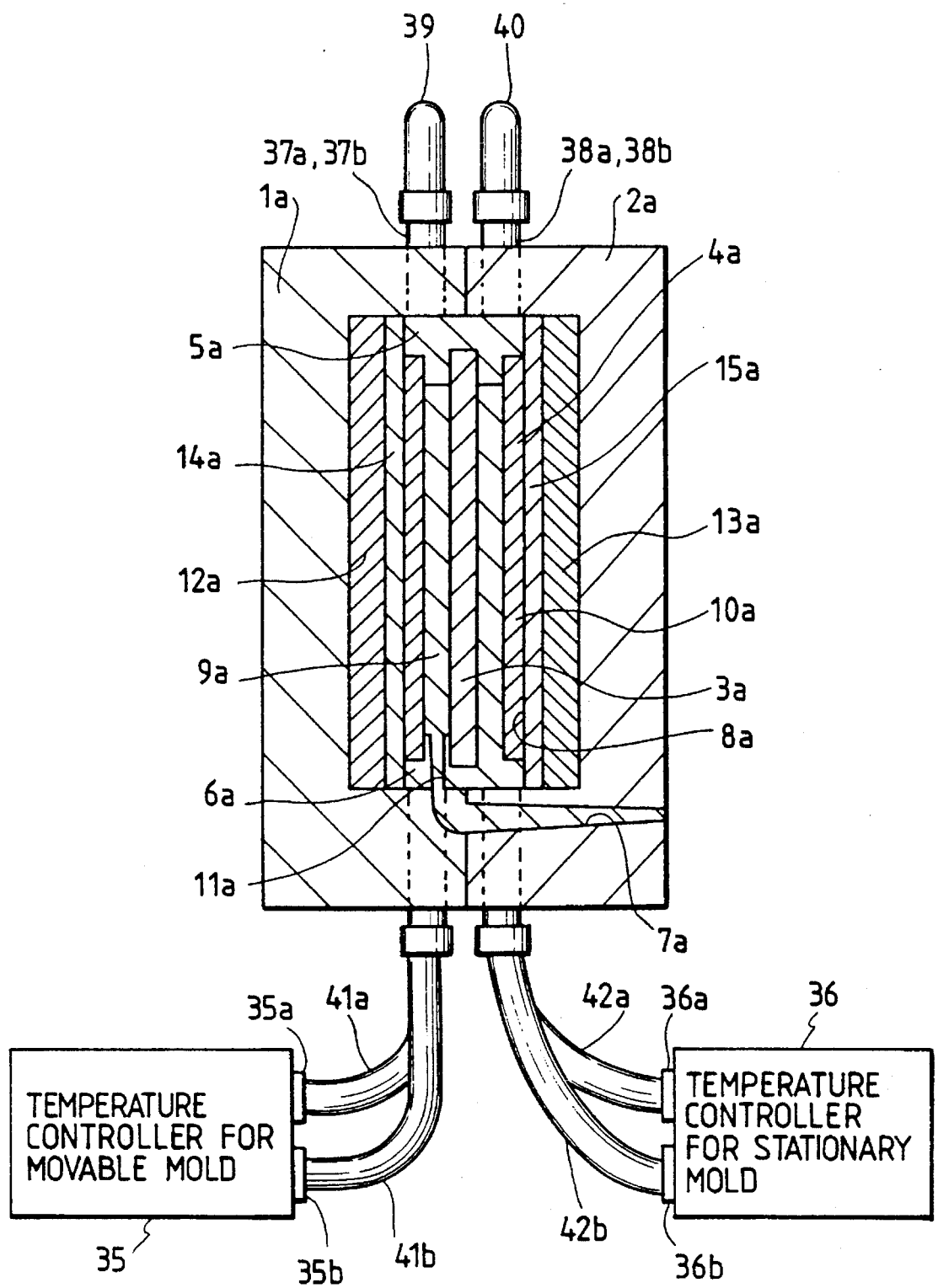
FIG. 10 a vertical sectional view showing the principal part of the manufacturing apparatus used for implementing a second embodiment of a magnet roller manufacturing method according to the present invention, and illustrating a state in which the metallic mold is closed.
Figure 11:
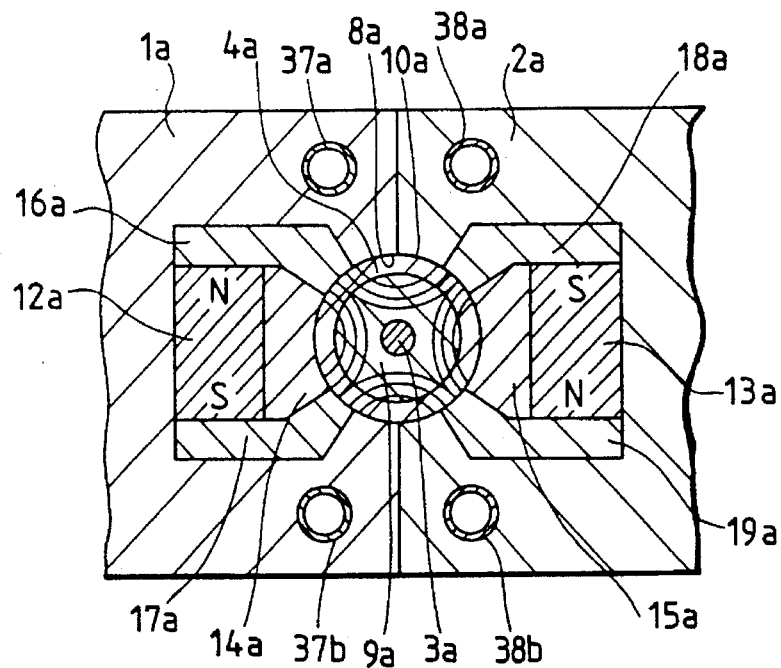
FIG. 11 is a transverse sectional view of an apparatus shown in FIG. 10.

As shown in FIG. 10 and FIG. 11, two heat medium pipes 37a and 37b extending in the upper and lower directions are inserted into a movable mold 1a. The upper ends of the two heat medium pipes 37a and 37b are connected by a bypass hose 39 to each other. Also, the lower end of the heat medium pipes 37a is connected to an outlet 35a of a temperature controller 35 for the movable mold, which will be described later, through a outflow hose 41a. The lower end of the other heat medium pipe 37b is connected to the inlet 345b of the temperature controller 35 through an inflow hose 41b. Oil, water, or other heat medium flows from the outlet 35a of the temperature controller 35. The flowing heat medium is returned to the temperature controller 35 through the outflow hose 41a, the heat medium pipes 37a, the bypass hose 39, the other heat medium pipe 37b, and the inflow hose 41b sequentially, thus making it possible to set the temperature of the movable mold 1a as desired.

Also, two heat medium pipes 38a and 38b extending in the upper and lower directions are inserted into a stationary mold 2a. The upper ends of the two heat medium pipes 38a and 38b are connected by a bypass hose 40 to each other. Also, the lower end of the heat medium pipes 38a is connected to an outlet 36a of a temperature controller 36 for stationary mold, which will be described later, through a outflow hose 42a. The lower end of the other heat medium pipe 38b is connected to an inlet 36b of the temperature controller 36 through an inflow hose 42b. Oil, water or other heat medium flows from the outlet 36a of the temperature controller 36. The flowing heat medium is returned to the temperature controller 36 through the outflow hose 42a, the heat medium pipes 38a, the bypass hose 40, the other heat medium pipe 38b, and the inflow hose 42b sequentially, thus making it possible to set the temperature of the stationary mold 2a as desired the temperature of the movable mold 1a.

The other structures of the present embodiment are the same as in the first embodiment of the manufacturing apparatus.

The description will be made of the method for manufacturing a magnet roller according to the present embodiment.

Figure 14:
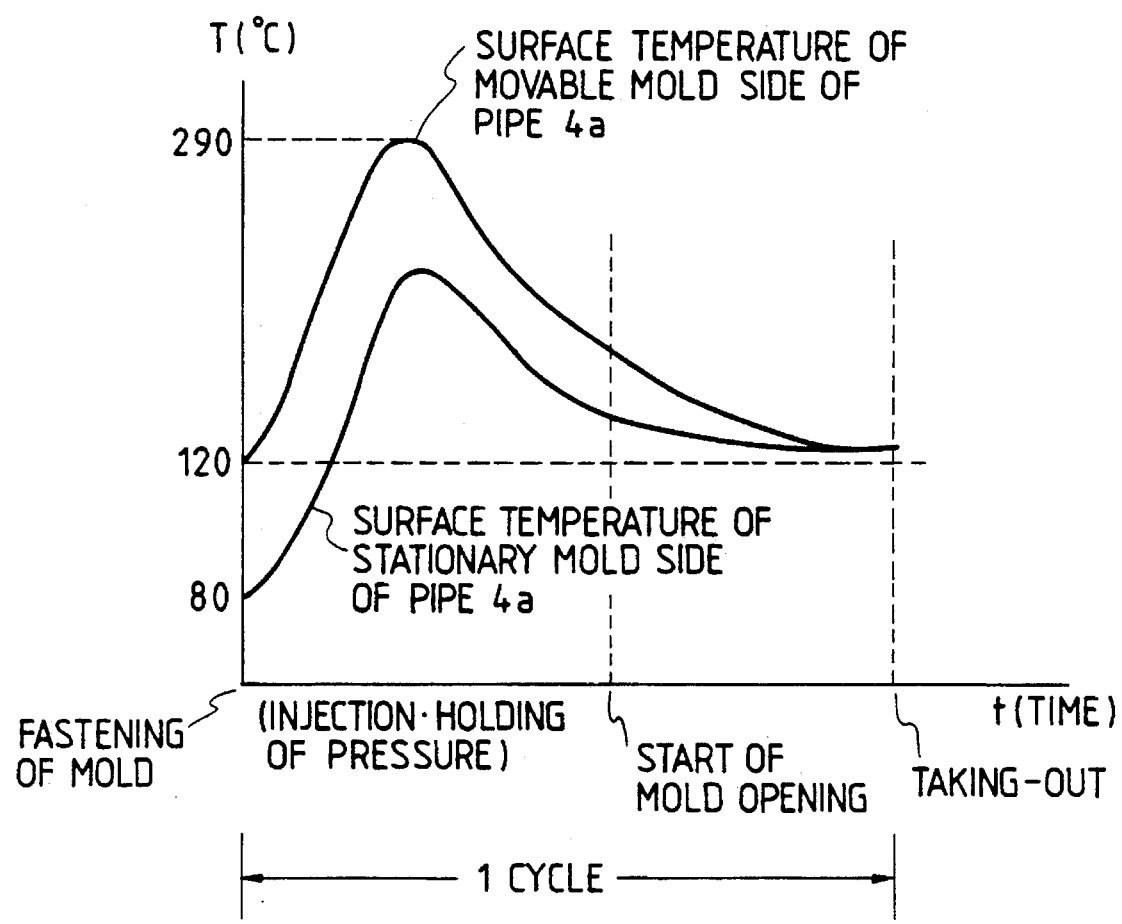
FIG. 14 is a graph showing the temperature variations of a pipe 4a in the second embodiment.

This manufacturing method is one such that a molded product is produced by an injection molding on the basis of formation timing ② shown in FIG. 8. Also, as shown in FIG. 14, the temperature of a stationary mold 2a is set lower than that of a movable mold 1a by means of two temperature controllers 35 and 36. Thus, the mold opening timing, the taking out timing and the temperature difference in the temperatures of the molds are determined so that the respective local temperatures on the stationary mold side and the movable mold side of the hollow member 10a can be made equal when a hollow member 10a is taken out.

As shown in FIG. 10 and FIG. 11, a heated hollow member 10a is mounted in the cavity 8a by closing the metallic mold and thereafter, the metallic mold is clamped. At this juncture, the temperatures of the movable mold 1a and stationary mold 2a are set at 120° C and 80° C. respectively as shown in FIG. 14. By this control over the temperature difference between the movable mold 1a and stationary mold 2a, the temperature of the resin in the pipes is maintained substantially equal from a time just before the time of taking out when the cooling effect is given, to a time after the movable mold is opened, thus making it possible to prevent the roller from warping and bending in the axial direction. The preliminarily molten resin magnetic material composed of ferromagnetic particles and binder is injected into the hollow member 10a from the nozzle of an injection molding machine (not shown) through a runner 7a and a hole 11a sequentially to fill the inside of the hollow member 10a with the resin magnetic material. Thus, a roller type resin magnet 9a is molded. At this juncture, the ferromagnetic particles in the roller type resin magnet 9a are oriented by the magnetic lines of force of the magnetic members 16a, 17a, 18a, and 19a, so that two pairs of magnetic poles are formed (at A of formation timing ② in FIG. 8).

Figure 12:
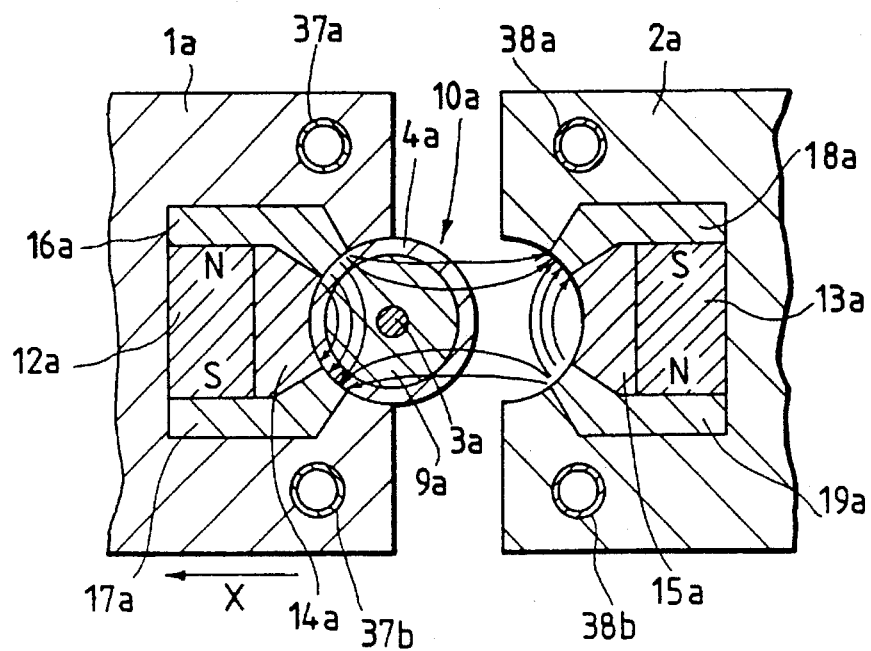
FIG. 12 is a view similar to FIG. 11 illustrating the state of the metallic mold in the course of being opened.

Subsequent to the injection of the resin magnetic material, a dwelling step is given for approximately 10 seconds. Then, after the second time $H_2$ (refer to FIG. 8, 17 seconds in the present embodiment) has elapsed, and before the injected material is cooled to be fully cured as roller type resin magnet 9a, the metallic mold is opened to separate the magnetic pole pair 16a and 17a of the movable mold 1a from the magnetic pole pair 18a and 19a of the stationary mold member 2a. While the mold is being opened as shown in FIG. 12 (at B of formation timing ② in FIG. 8), the hollow member 10a is conveyed in the direction indicated by an arrow X together with the movable member 1a. Thus, the magnetic lines of force between the magnetic members 18a and 19a of the stationary mold member 2a separate from the roller type resin magnet 9a, and the magnetic flux density of the magnetic lines of force connecting the magnetic members 16a and 17a of the movable mold 1a and the magnetic members 18a and 19a of the stationary mold member 2a and passing through the roller type resin magnet 9a, becomes greater on the movable mold 1a side. Thus, the magnetic flux passing through the inside of the hollow member 10a changed, whereby the magnetic flux density of the magnetic pole pair on the movable mold 1a side becomes greater than that of the magnetic pole pair on the stationary mold 2a side in the two pairs of the magnetic poles formed at the roller type resin magnet 9a. Moreover, in the present embodiment, at least during the step of opening the mold, the temperature of the roller type resin magnet 9a is higher on the movable mold 1a side than the stationary mold 2a side. Accordingly, a meltability of the roller type resin magnet 9a is larger on the movable mold 1a side than the stationary mold 2a side. Hence, the difference between the magnetic flux density of the magnet pole pair on the movable mold 1a side and the flux density of the magnet pole pair on the stationary mold 2a side, which are formed on the roller type resin magnet 9a, becomes greater as compared with a difference obtained in the first embodiment.

Figure 13:
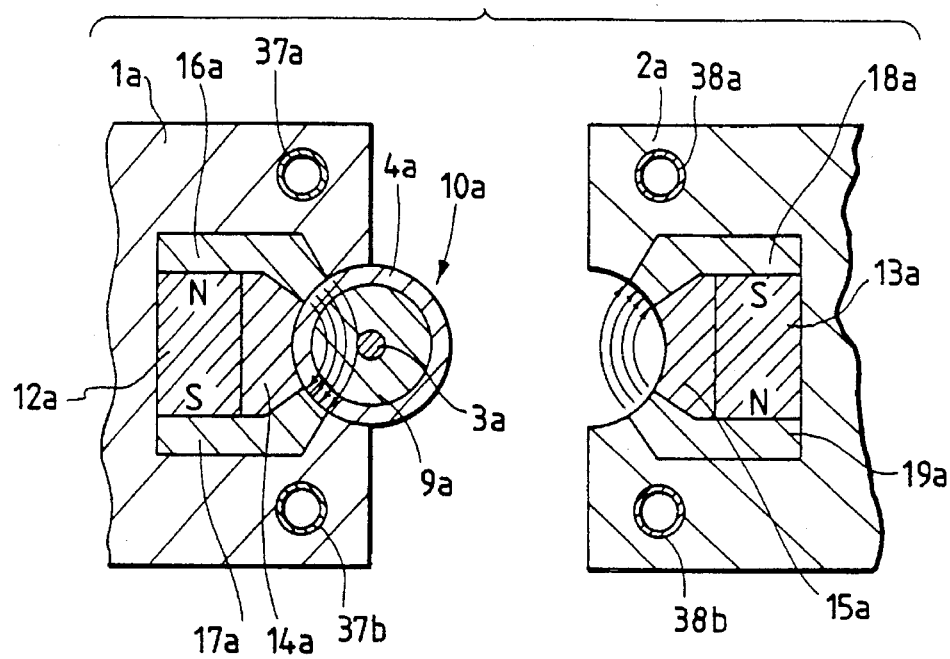
FIG. 13 is a view similar to FIG. 11 illustrating the state of the metallic mold having been completely opened.

As shown in FIG. 13, after a state in which the mold opening is finished (at C of formation timing ② in FIG. 8) is maintained for the first time $h_1$ (two seconds in the present embodiment), the metallic mold is taken out from the hollow member 10a.

When the roller type resin magnet 9a in the hollow member 10a has further cooled, a gap forms between the molded product and the pipe 4a due to the cooling contraction of the roller type resin magnet 9a. The runner portion is cut off approximately five minutes after the hollow member is taken and removed from the mold cavity defined by the stationary and movable mold elements, further, the two end portions 5a and 6a of the hollow member 10a are separated from the pipe 4a to remove the molded product from the pipe 4a. Lastly, the gate portion of the molded product is cut off, and a ground finish is given to the cut-off portion, to obtain a magnet roller 25 of 200 mm long and 20 mm diameter integrally formed with the roller portion 24 molded with the core bar 3a and resin magnetic material as shown in FIG. 7 and FIG. 9B. The distribution of the surface magentic flux density of the magnet roller 25 is indicated by broken lines in FIG. 9B.

Third Embodiment

Description will now be made of a third embodiment of the method for manufacturing a magnet roller according to the present invention.

First description will be made of a manufacturing apparatus comprising a metallic mold, a hollow member and other elements used for implementing this manufacturing method.

Figure 15:
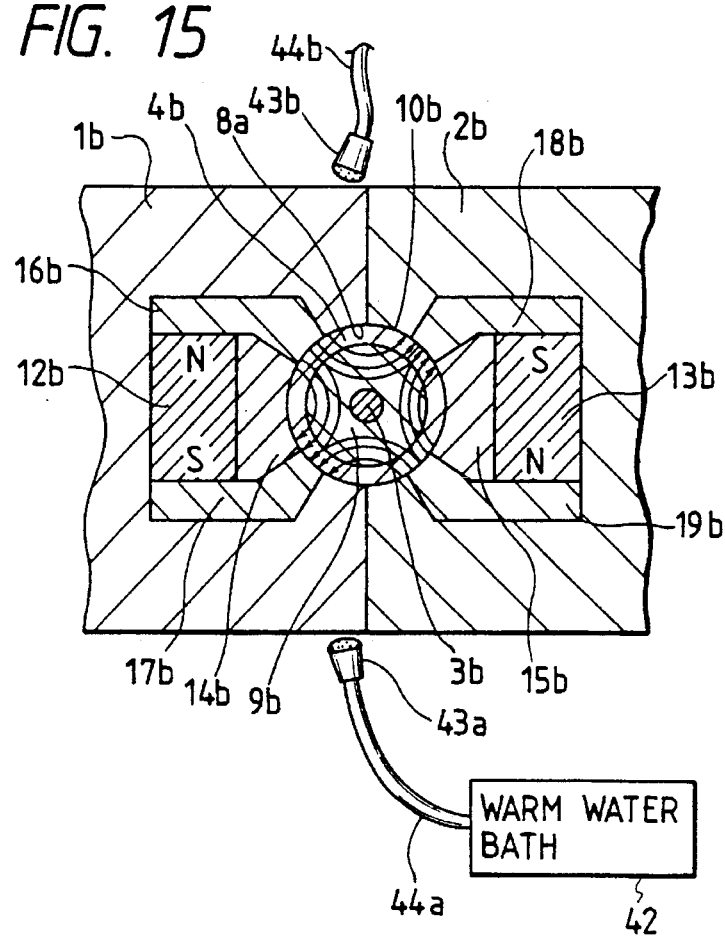
FIG. 15 is a vertical sectional view showing the principal part of the manufacturing apparatus used for implementing a third embodiment of a magnet roller manufacturing method according to the present invention, and illustrating a state in which the metallic mold is closed.
Figure 16:
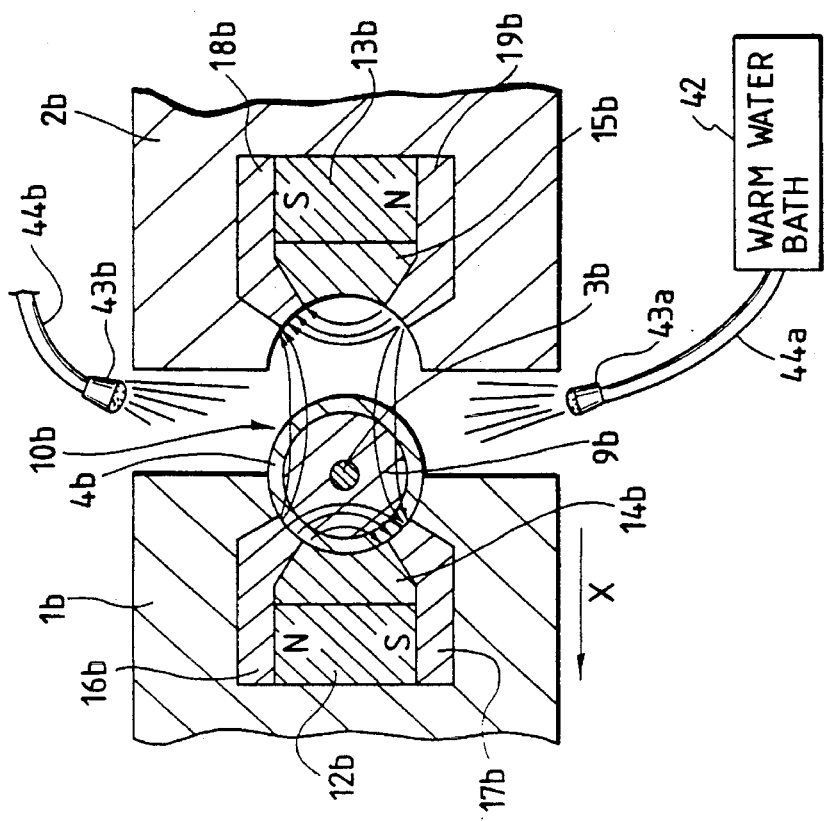
FIG. 16 is a view similar to FIG. 15 illustrating the state of the metallic mold in the course of being opened.

As shown in FIG. 15, an apparatus for cooling the hollow member comprises a warm water bath 42 and jet nozzles 43a and 43b connected to the warm water bath 42 through hoses 44a and 44b, respectively. As shown in FIG. 16, during the step of opening the mold, warm water dispersedly discharged from the two jet nozzles 43a and 43b as a coolant is applied to the outer surface of the portion of the hollow member 10b which is not held by the movable mold 1b, thus enabling the temperature of the portion to be set lower than the temperature of the remaining portion. The other structural elements of this embodiment are the same as those of the manufacturing apparatus described in the first embodiment.

Description will now be made of a method for manufacturing a magnet roller according to the present embodiment.

This manufacturing method is one such that a molded product is produced by an injection molding on the basis of formation timing ③ shown in FIG. 8.

First as shown in FIG. 16, pre-heated hollow member 10b is mounted in the cavity 8b by closing the metallic mold, whereby the metallic mold is clamped. A preliminarily molten resin magnetic material composed of ferromagnetic particles and binder is injected into the hollow member 10b from the nozzle of an injection molding machine (not shown) to fill the inside of the hollow member 10b (mold cavity) with the resin magnetic material. Thus, a roller type resin magnet 9b is molded. At this juncture, the ferromagnetic particles in the roller type resin magnet 9b are oriented by the magnetic lines of force of the magnetic members 16b, 17b, 18b, and 19b, so that two corresponding pairs of magnetic poles are formed (at A of formation timing ③ in FIG. 8). The temperature of each of the movable mold 1b and stationary mold 2b is 130° C.

Subsequent to the injection of the resin magentic material, a dwelling step is given for approximately 10 seconds. Then, after the first time $H_1$ (refer to FIG. 8, 12 seconds in the present embodiment) has elapsed, and before the injected material is cooled to be fully cured as a roller type resin magnet 9b, the metallic mold is opened to separate the magnetic pole pair 16b and 17b of the movable mold 1b from the magnetic pole pair 18b and 19b of the stationary mold member 2b.

While the mold is being opened as shown in FIG. 16 (at B of formation timing ③ in FIG. 8), the hollow member 10b is conveyed in the direction indicated by an arrow X together with the movable member 1b. Thus, the magnetic lines of force between the magnetic members 18b and 19b of the stationary mold member 2b are separated from the roller type resin magnet 9b, and the magnetic flux density connecting the magnetic members 16b and 17b of the movable mold 1b and the magnetic members 18b and 19b of the stationary mold member 2b and passing through the roller type resin magnet 9b, becomes greater on the movable mold 1b side. Thus, the magnetic flux passing through the inside of the hollow member 10b changes, whereby the magnetic flux density of the magnetic pole pair on the movable mold 1b side becomes greater than that of the magnetic pole pair on the stationary mold 2b side in the corresponding pairs of magnetic poles formed in the roller type resin magnet 9b. Moreover, although the temperature of each of the molds 1b and 2b is equal before the mold opening step, as in the first embodiment, warm water is despersedly discharged from the two jet nozzles 43a and 43b during the mold opening step, so that this warm water is applied to the outer surface of a portion of the hollow member 10b which is not held by the movable mold 1b, to cool the surface. Accordingly, a meltability of the roller type resin magnet 9b is larger on the movable mold 1b side than the stationary mold 2b side. Thus, the difference between the magnetic flux density of the magnet pole pair on the movable mold 1b side and the flux density of the magnet pole pair on the stationary mold 2b side, which are formed in the roller type resin magnet 9b, is increased relative to a difference obtainable in the first embodiment.

Figure 17:
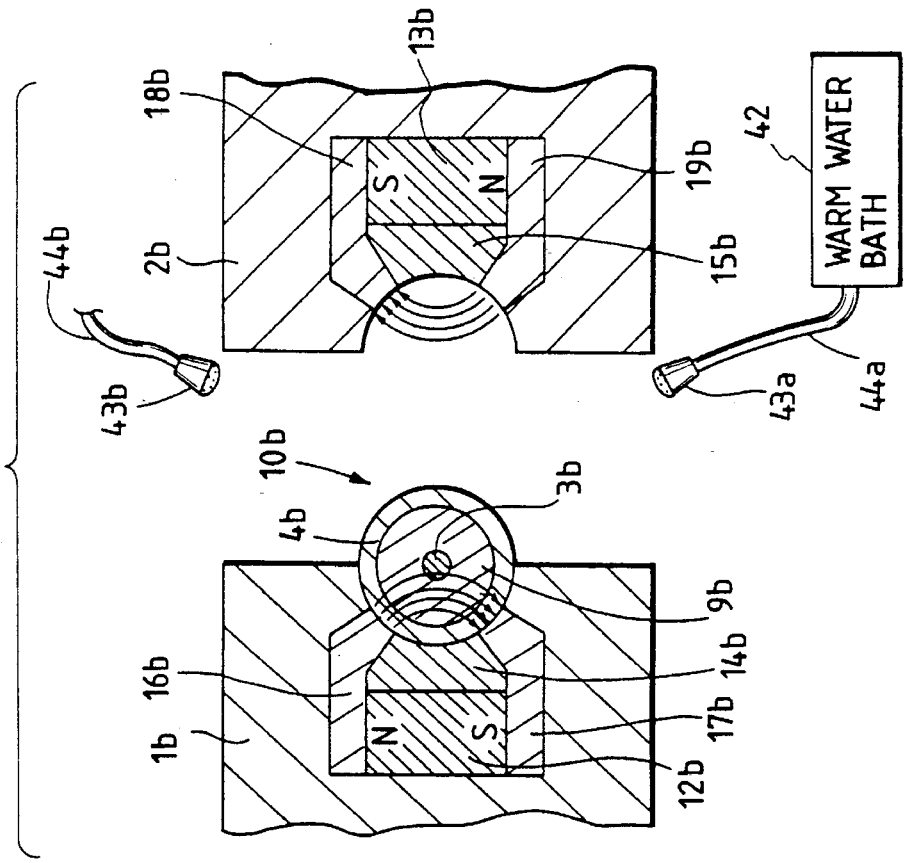
FIG. 17 is a view similar to FIG. 15 illustrating the state of the metallic mold having been completely opened.

As shown in FIG. 17, a state in which the mold opening step is finished (at C of formation timing ③ in FIG. 8) is maintained for the second time $h_2$ (five seconds in the present embodiment), and the metallic mold is taken out from the hollow member 10b.

When the roller type resin magnet 9b in the hollow member 10b is further cooled, a gap forms between the molded product and the pipe 4b due to the cooling contraction of the roller type resin magent 9b. The runner portion is cut off approximately five minutes after the hollow portion is removed from the mold cavity defined by stationary and movable mold elements. 10b are separated from the pipe 4b to remove the molded product from the pipe 4b. Lastly, the gate portion of the molded product is cut off, and ground finish is given to the cut-off portion, to obtain a magnet roller 26 of 200 mm long and 20 mm diameter integrally formed with the roller portion 24 molded with the core bar 3b and resin magnetic material as shown in FIG. 7 and FIG. 9C. The distribution of the surface magnetic flux density of the magnet roller 26 is indicated by broken lines in FIG. 9C.

In the present embodiment, while an example is shown, in which warm water is dispersedly discharged as a coolant onto the hollow member for cooling it, the present invention is not limited thereto, and it may be possible to blow a draft as a coolant.

The magnet roller obtained according to each of the above-mentioned embodiments can be used as it is, or a magnet roller may be magnetized first by known means and then remagnetized for use.

In each of the above-mentioned embodiments, while description has been made of manufacturing a magnet roller having two pairs of magnet poles, it may be possible to mold a magnet roller having three or more pairs of magnet poles.

Figure 18:
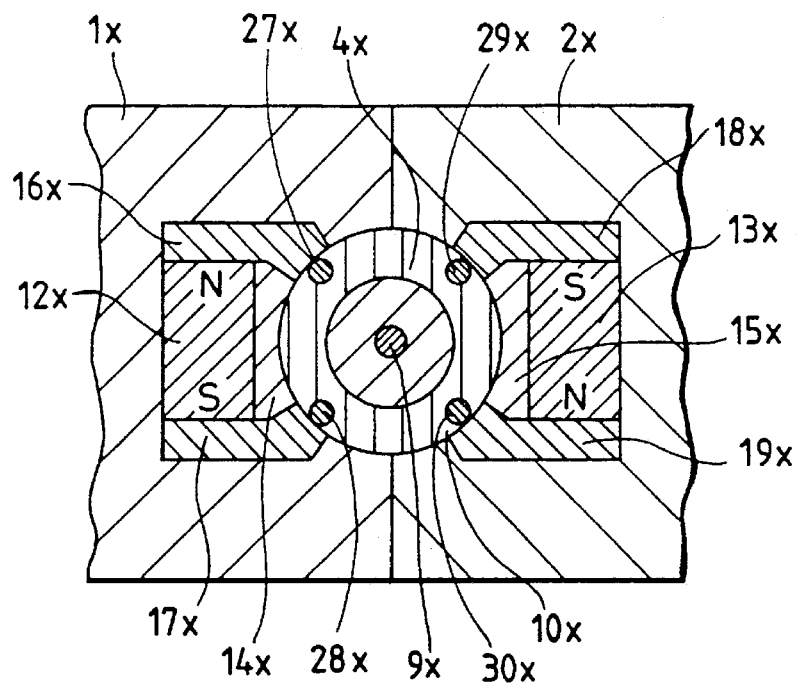
FIG. 18 is a view showing an example of a variation of the magnet roller manufacturing apparatus.
Figure 19:
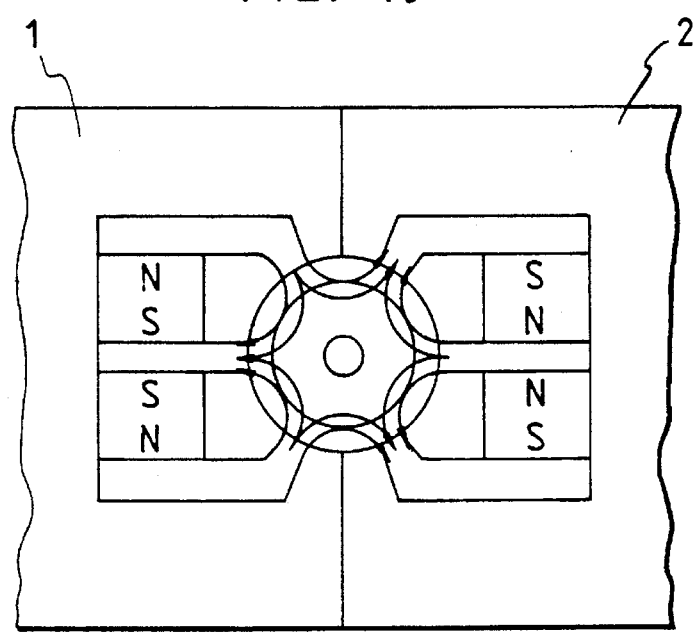
FIG. 19 is a transverse sectional view showing the principal part of a metallic mold when the number of magnetic poles of the magnet roller is increased to six.
Figure 20A:
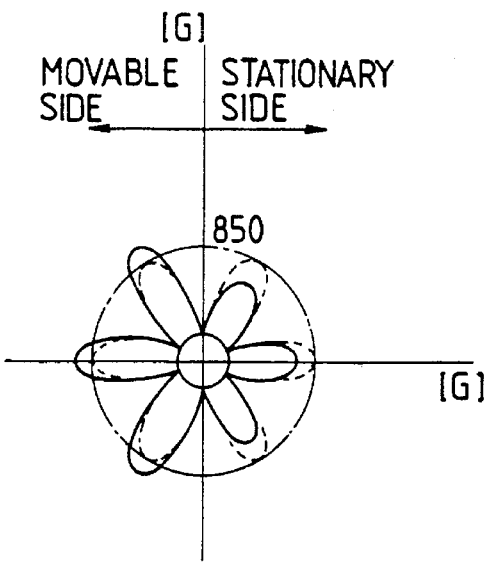
FIGS. 20A to 20C are graphs showing the density distributions of the surface magnetic flux of a magnet roller molded by the metallic mold shown in FIG. 19.
Figure 20B:
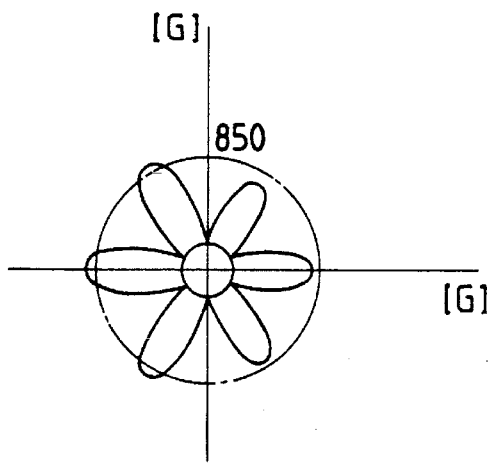
Figure 20C:
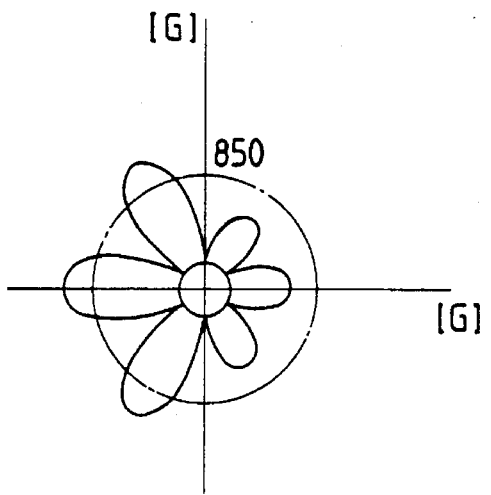

Also, as shown in FIG. 18, a hollow member 10x is used in which magnetic bars 27x and 30x and magnetic bars 28x and 29x are embedded at the circumferential positions on the metallic mold opposed respectively to the magnetic members 16x and 19x as magnetic exciting pole and magnetic members 17x and 18x as magnetic ending pole, and its thickness is large, or its strength is high, whereby a molded product of a desirable quality can be produced without any reduction in the magnetic force for orientation.

The thickness dimension of the inner circumferential portion of the hollow member 10x where the magnetic bars 27x, 28x, 29x, and 30x are not provided, is made equal to the thickness of the hollow member employed in each of the above-mentioned embodiments. It is preferable to define the thickness approximately 2 mm or less from the viewpoint of the magnetic characteristics required. It may be possible to shape the cross section of each of the magnetic bars 27x, 28x, 29x, and 30x oblong or trapezoid. It is not necessarily confined to being circular.

FIG. 19 and FIGS. 20A to 20C are views showing still another embodiment according to the present invention, in which are represented the cross-section of the principal part of a metallic mold for a magnet roller having six magnetic poles (FIG. 19) and distributional diagrams of the surface magnetic flux densities of the magnet rollers molded using the metallic mold.

Next, description will be made of a development unit (developing machine) according to the present invention.

Figure 21:
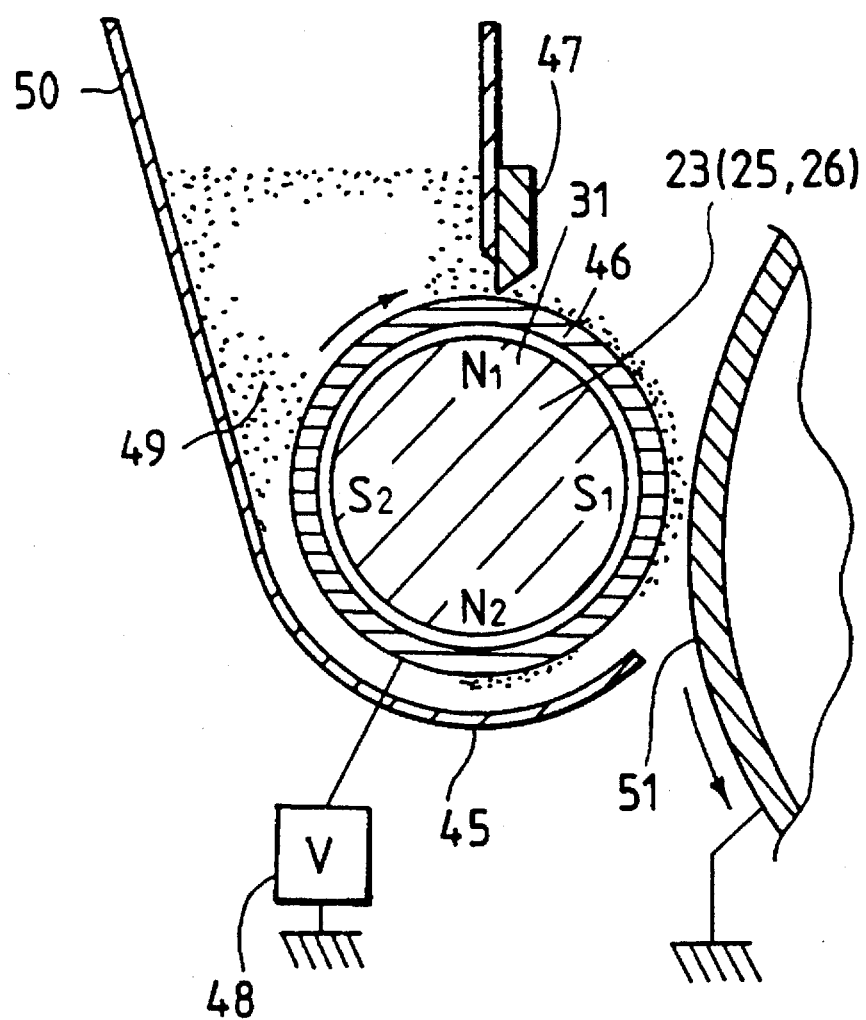
FIG. 21 is a cross-sectional view showing a development unit according to the present invention.

As shown in FIG. 21, an upper part of the developing container 45 is structured as a hopper portion 50 for storing toner 49. At the lower part of the development container 45, there is provided a sleeve 46 which is rotatively driven as a developer supporting member. A magnet roller 23 (25 and 26) of the present invention is fixedly incorporated in the sleeve 46. At a position opposite to one magnetic pole $N_1$ 31 of the magnet roller 23 (25 and 26), a blade 47 composed of a magnetic body is provided. A power source 48 provided for applying alternating current between the sleeve 46 and a photosensitive drum 51.

Operation of the development unit will be described hereafter.

Toner 49 is stored in the hopper portion 50 and is attracted onto the sleeve 46 by the magnetic force of the magnet roller 23 (25 and 26). The toner on the sleeve 46 is charged by friction with the sleeve 46 due to the rotation of the sleeve 46. A stabilized charge is given to the toner by an additive controlling agent contained in the toner. The toner is carried to the blade 47 by the rotating sleeve 46. At a position opposite the blade 47, a magnetic pole $N_1$ 31 is arranged. The toner is regulated to be a given thickness by the magnetic field produced between the blade 47 and the magnetic pole $N_1$ 31 and the gap between the blade 47 and the sleeve 46. The toner remaining at the time of the thickness control by the blade 47 produces a convective state of a certain size in front of the blade 47.

The sleeve 46 is further rotated to face the photosensitive drum 51. The toner layer facing the photosensitive drum 51 is caused to stand due to the magnetic force of a developing magnetic pole $S_1$, and is reciprocally moved by the low frequency alternating electric field applied between the electrostatic latent image on the photosensitive drum 51 and the sleeve 46, thus being allowed to adhere only to the positions where the latent image is charged. The toner remaining on the sleeve 46 after the development is carried to the inside of the developing container 45 by further rotation of the sleeve 46 and the magnetic force of the carrier magnetic poles $N_2$ and $S_2$.

Description will now be made of a copying apparatus according to the present invention, exemplifying a copying machine. While a copying machine will be described as an example, it may be possible to incorporate the development unit of the present invention in a printer.

As shown in FIG. 22, the copying machine comprises a transferring unit 70 having the abovementioned development unit 75 for transferring toner images to a copying medium 100, a feeding unit 60 for supplying the copying medium 100 to the transferring unit 70, a cleaning unit 80 for cleaning the surface of the photosensitive member after the toner images have been transferred to the copying medium 100, and a fixing unit 90 for fixing on the copying medium 100 the toner images transferred to the copying medium 100.

The feeding unit 60 has a feeding roller 64 supported by a shaft rotatable in the direction indicated by an arrow shown in FIG. 22 and a sheet cassette 61 for stacking a number of sheet type copying media 100 therein. The right-hand ends of the copying media 100 shown in FIG. 22 stacked on the sheet cassette 61 are pressed against the feeding roller 64 by a separation pad 62 which is biased above by a spring. Also, on the right-hand side of the separation pad 62 shown in FIG. 22, there is arranged a separation pad 63 which is pressed against the feeding roller 64 by a spring. Then, the feeding roller 64 is rotated, whereby a copying medium on the uppermost position of the stacked copying media 100 is separated from the others in cooperation with the separation pad 62. Thus, the copying media is supplied to the transferring unit 70 one by one. In order to prevent the copying medium from being crinkled, the feeding roller 64 is shaped like a reversed crown because the roller is pressed against the copying medium 100 to carry it by friction created between them, and its elastic layer is made of polynorbornene. The hardness of the polynorbornene is 40 degrees by Asker scale C according to JRIS (Japan Rubber Institute Standard).

In the transferring unit 70 is pivotably and rotatably supported the photosensitive drum 51 as an image carrier having a photosemiconductivity so that an electric charge is maintained and a current flows only where light irradiation is given and an electrical potential in such a position is lost. An electrically charged roller 71 having electric conductivity connected to a power source (not shown) is arranged and pressed in contact with the surface of the photosensitive drum 51. The power source and the electrically charged roller 71 constitute a charging unit. When the photosensitive drum 51 is rotated while a given voltage is being applied from the power source to the electrically charged roller 71, the surface of the photosensitive drum 51 is uniformly charged. Therefore, it is desirable that the electrically charged roller 71 contacts the photosensitive drum 51 with a uniform nipping width. The roller is formed as a crown type. Also, its elastic layer is made of EPDM of approximately 3 mm thick and the hardness of the EPDM is within a range of 60 to 70 degrees according to JIS K 6301. Further, on the surface of the EPDM, hydrin rubber is coated in a thickness of approximately 200 μm, and a deresin coating is further provided thereon in a thickness of approximately 10 μm. Thus, while the electrial conductivity of the charged roller 71 is maintained, the surface of the charged roller 71 is protected from any stain and the exudation of impurity from the inside of the charged roller 71 is prevented. The light from the light source 56, is reflected at the original stacker 58, then irradiated to the photosensitive drum 51 whose surface has been uniformly charged. At this juncture, the light is irradiated onto the surface of the photosensitive drum 51 in responce to characters and image patterns of an original (not shown) stacked on the original stacker 58, and the electric potential on such irradiated locations is lost, so that latent images are formed on the surface of the photosensitive drum 51.

There is provided a developing device 75 on the downstream side in the rotational direction of the photosensitive drum 51 with respect to the position of the photosensitive drum 51 where the reflected light from the light source 56 is irradiated. Thus, to the surface of the photosensitive drum 51, toner adhers by the developing device 75 to form the toner images accordingly. The toner charged with the same polarity as the photosensitivity drum 51 is contained in the developing device 75. The toner adheres to portions of the latent images having no electric potential on the photosensitive drum 51. The photosensitive drum 51 on which the toner images have been formed, contacts with a copying medium 100 carried from the feeding unit 60. At this juncture, the copying medium 100 is charged with the polarity opposite to the toner by means of a transferring charger 52. Thus, the toner on the photosensitive drum 51 is attracted to the copying medium 100 and transferred to the copying medium 100. The copying medium 100 to which the toner images have been transferred is destaticized by a destaticizing needle 53. On the other hand, in the case of transferring the toner images to the copying medium 100, it is difficult to transfer them completely to the copying medium 100, and some toner remains on the photosensitive drum 51. It is therefore necessary to remove the remains toner on the photosensitive drum 51 by the cleaning unit 80.

In the cleaning unit 80, a cleaning blade 81 is provided so that one of the edges of its free end is pressed to and contacts with the photosensitive drum 51. On the upstream side of the cleaning blade 81 with respect to the rotational direction of the photosensitive drum 51, a cleaning roller 82 is provided so as to be pressed to and contacted with the photosensitive drum 51. Foreign matters such as remaining toner and paper dusts on the surface of the photosensitive drum 51 which have arrived at the cleaning unit 80 are firstly removed by the slide rubbing of the cleaning roller 82, and are held on the cleaning roller 82. To this end, it is necessary for the cleaning roller 82 to contact the photosensitive drum 51 with a uniform nipping width. The roller is therefore shaped like a crown. Its elastic layer comprises an inner layer made of silicon rubber having a hardness of 34± four degrees according to Asker scale C and an outer layer made of urethane rubber. The toner which is not removed by the cleaning roller 82 is scraped off by the cleaning blade 81 and held on the cleaning roller 82. Then, the foreign matters held on the cleaning roller 82 are scraped off by a scraper 83 into a toner reservoir for accumulation and are discharged outside the cleaning unit 80 by means of a carrier screw 84.

On the other hand, the copying medium 100 to which the toner images have been transferred is carried to the fixing unit 90 by a conveyer belt 54. In the fixing unit 90, a fixing roller 91 is pivotably and rotatably supported with a heater 92 provided therein as roller heating means. A pressure roller 94 is pressed to and contacted with the fixing roller 91. The pressure roller 94 follows the rotation of the fixing roller 91. The copying medium 100 carried to the fixing unit 90 is guided by a sheet guide 95 to be placed between the fixing roller 91 and the pressure roller 94, and is pinched by both rollers 91 and 94. At this juncture, since the fixing roller 91 has been heated by the heater 92, the toner adhering to the copying medium 100 is fused under pressure between the fixing roller 91 and pressure roller 94 to be fixed to the copying medium 100. The fixing roller 91 and pressure roller 94 are of a reversed crown type so as to prevent the copying medium 100 from being crinkled. The fixing roller 91 is structured so that an elastic layer of HTV (high temperature curing type) silicone rubber of 200 to 300 μm thick (hardness within a range of 60 to 70 degrees according to JIS K 6301) is formed on an aluminum hollow pipe (core metal member) into the hollow portion of which the heater 92 is inserted. Further fluoric resin is coated thereon. The pressure roller 94 is structured so that an elastic layer made of LTV (low temperature hardening type) silicone rubber of 1 to 10 μm thick (hardness within a range of 20 to 50 degrees according to JIS K 6301) is formed on a core metal member. In this fixing step, there may be some cases where the toner transferred to the copying medium 100 adheres to the fixing roller 91. However, such toner is removed from the fixing roller 91 by means of the cleaning pad 93 which is in contact with the fixing roller 91. The surface of the fixing roller 91 is maintained clean.

When the fixing step is terminated, the copying medium 100 is discharged to the outside of the copying machine by means of a sheet discharging roller 55 and is stacked on a discharged sheet tray.

The present invention, being structured as set forth above, produces effects given below.

According to the present invention, since a molded product is integrally molded using a resin magnetic material, it is possible to provide a magnet roller having a high dimensional precision and configurational precision with the result that an excellent magnetic characteristic is obtained.

According to the invention, the aforesaid magnet roller can be manufactured with simple manufacturing processes. Also, immediately after the mold opening takes place, the magnetic lines of force for orientation generated between the pair of magnetic poles on the stationary mold member produces a strong effect on the orientation of the magnetic particles in the roller type resin magnet, thus making it possible to control the magnetic waveforms by the speed at which the mold is opened.

According to the invention, the difference in the magnetic flux densities of the plural pairs of magnetic poles formed in the magnet roller becomes greater, According to the present invention, it is easier to implement each of the above-mentioned manufacturing methods.

According to the present invention, a magnet roller is provided with excellent magnetic characteristics which enables the density of a developed image to be set within a regulated range, thus providing a development unit capable of developing high quality images.

According to the present invention, a printing apparatus capable of producing images of high quality can be provided.

What is claimed is:

1. A magnet roller comprising a resin magnetic material in which magnetic material is mixed with a binder material in a molten state and injection molded to form an integral molded product having a symmetric cross-section, and including plural pairs of magnetic poles, each comprising a magnetic exciting pole and a magnetic ending pole for generating magnetic lines of force therebetween, the plural pairs of magnetic poles being arranged at circumferential positions of said integral molded product, a surface magnetic flux density of at least one pair of magnetic poles being different from that of the other pairs of magnetic poles.

2. A magnet roller according to claim 1, wherein said magnet roller is adapted for use in an image forming apparatus.

3. A development unit comprising:
  a rotational sleeve for developing latent images by holding and carrying toner to be supplied to a photosensitive drum;
  a magnet roller comprising a resin magnetic material in which magnetic material is mixed with a binder material in a molten state and injection molded to form an integral molded product having a symmetric cross-section, and including plural pairs of magnetic poles, each comprising a magnetic exciting pole and a magnetic ending pole for generating magnetic lines of force therebetween, the plural pairs of magnetic poles being arranged at circumferential positions of said integral molded product, a surface magnetic flux density of at least one pair of magnetic poles being different from that of the other pairs of magnetic poles, said magnet roller being arranged in said rotational sleeve; and
  a blade arranged at a position opposing one of the magnetic poles of said magnet roller with a gap between said blade and said rotational sleeve, for regulating a thickness of said toner on said rotational sleeve.

4. A printing apparatus comprising:
  a photosensitive member having a surface;
  a development unit for transferring toner images to a copying medium, said development unit comprising:
    a rotational sleeve for developing latent images by holding and carrying toner to be supplied to a photosensitive drum;
    a magnet roller comprising a resin magnetic material in which magnetic material is mixed with a binder material in a molten state and injection molded to form an integral molded product having a symmetric cross-section, and including plural pairs of magnetic poles, each comprising a magnetic exciting pole and a magnetic ending pole for generating magnetic lines of force therebetween, the plural pairs of magnetic poles being arranged at circumferential positions of said integral molded product, a surface magnetic flux density of at least one pair of magnetic poles being different from that of the other pairs of magnetic poles, said magnet roller being arranged in said rotational sleeve; and
    a blade arranged at a position opposing one of the magnetic poles of said magnet roller with a gap between said blade and said rotational sleeve, for regulating a thickness of said toner on said rotational sleeve;
  a feeding unit for supplying a copying medium to said development unit;
  a cleaning unit for cleaning the surface of the photosensitive member subsequent to transferring toner images to a copying medium; and
  a fixing unit for fixing to a copying medium toner images transferred to the copying medium.

5. A molded resin magnet roller, comprising:
  a roller body composed of resin material prepared by mixing magnetic material with binding material and heating to a molten state, the molten resin material being injected into a cylindrical member disposed in a cavity formed by a stationary mold member and a movable mold member, to form a roller body having a symmetrical cross-section; and
  a plurality of magnetic poles formed in said roller body by magnetizing said magnetic material by applying an external source of magnetic lines of force thereto, whereby a magnetic flux density of said magnetic material is made non-uniform.

6. A magnet roller according to claim 5, wherein said magnet roller is adapted for use in an image forming apparatus.

7. A magnet member comprising:
  a body composed of magnetic material and binding material mixed in a molten state, the molten magnetic and binding material being injected into a hollow member disposed in a cavity of a stationary mold member and a movable mold member to form a body having a symmetrical cross-section; and
  a plurality of magnetic poles formed in said body by magnetizing said magnetic material by applying an external source of magnetic lines of force thereto, whereby a magnetic flux density of said magnetic material is made non-uniform.

8. A magnet member according to claim 7, wherein said magnet member is adapted for use in an image forming apparatus.

9. A magnet member comprising:
  a body composed of a resin material made by mixing magnetic material with binding material and molding into a roller shape having a symmetrical cross-section, the body of resin material having a plurality of magnetic pole pairs, wherein a distribution of magnetic flux density in said plurality of magnetic pole pairs is non-uniform.

10. A magnet member according to claim 9, wherein said magnet member is adapted for use in an image forming apparatus.

* * * * *

UNITED STATES PATENT AND TRADEMARK OFFICE
CERTIFICATE OF CORRECTION

PATENT NO. : 5,570,167  Page 1 of 4
DATED : October 29, 1996
INVENTOR(S) : MASAAKI KURODA It is certified that error appears in the above-indentified patent and that said Letters Patent is hereby corrected as shown below:

On title page, item

[56] References Cited:

U.S. PATENT DOCUMENTS

```
Insert --2,465,276   03/1949   Ryder.....425/DIG.33
        4,250,128    02/1981   Meckling......264/24
        4,640,808    02/1987   Okumura...264/DIG.58
        4,661,053    04/1987   Yokota.........425/3
        4,911,627    03/1990   Leupold...425/DIG.33
        5,352,394    10/1994   Fujita......425/3--.
```

FOREIGN PATENT DOCUMENTS

```
Insert --63-44285     09/1988    Japan
         62-216208    09/1987    Japan--.
```

[57] ABSTRACT:

Line 2. "hollow, member" should read --hollow member,--.
Line 12, "member" should read --member,--.

UNITED STATES PATENT AND TRADEMARK OFFICE
CERTIFICATE OF CORRECTION

PATENT NO. : 5,570,167
DATED : October 29, 1996
INVENTOR(S) : MASAAKI KURODA

It is certified that error appears in the above-indentified patent and that said Letters Patent is hereby corrected as shown below:

COLUMN 1:

Line 12, "is;" should read --is--.
    Line 15, "of the" should be deleted.
    Line 16, "to;" should read --to--.
    Line 17, "there for." should read --therefor.--.
    Line 28, "hose" should read --those--.
    Line 58, "drawback." should read --drawbacks.--.

COLUMN 2:

Line 41, "member alternatively," should read --member. Alternatively,--.

COLUMN 3:

Line 13, "tween" should read --tween,--.
    Line 62, "o#the" should read --of the--.

COLUMN 5:

Line 30, "magnetic" should read --(magnetic--.
    Line 31, "magnetic" should read --(magnetic--.
    Line 42, "set" should be deleted.
    Line 44, "set" should be deleted.

UNITED STATES PATENT AND TRADEMARK OFFICE
CERTIFICATE OF CORRECTION

PATENT NO. : 5,570,167
DATED : October 29, 1996
INVENTOR(S) : MASAAKI KURODA

It is certified that error appears in the above-indentified patent and that said Letters Patent is hereby corrected as shown below:

COLUMN 7:

Line 2, "strontium is used ferrite in" should read --strontium ferrite preferably is used in--.
Line 45, "Further" should read --Further,--.
Line 57, "will" should read --will now--.
Line 60, "First" should read --First,--.

COLUMN 8:

Line 4, "a" should read --an--.
Line 6, "345b" should read --35b--.
Line 20, "a" should read --an--.
Line 30, "desired" should read --desired,--.
Line 34, "the" (second occurrence) should read --a--.
Line 52, "80°C" should read --80°C,--.
Line 55, "in" should read --of--.

COLUMN 9:

Line 51, "elements, further," should read --elements.  Further,--.

UNITED STATES PATENT AND TRADEMARK OFFICE
CERTIFICATE OF CORRECTION

PATENT NO. : 5,570,167
DATED : October 29, 1996
INVENTOR(S) : MASAAKI KURODA

It is certified that error appears in the above-indentified patent and that said Letters Patent is hereby corrected as shown below:

<u>COLUMN 11</u>:

Line 17, "magent" should read --magnet--.

<u>COLUMN 14</u>:

Line 48, "Further" should read --Further,--.

<u>COLUMN 15</u>:

Line 13, "greater," should read --greater.--.

Signed and Sealed this

Twenty-second Day of April, 1997

Attest:

BRUCE LEHMAN

Attesting Officer

*Commissioner of Patents and Trademarks*